Patented Jan. 21, 1930

1,744,699

UNITED STATES PATENT OFFICE

EDWARD C. HAINES, OF PARLIN, NEW JERSEY, ASSIGNOR TO E. I. DU PONT DE NEMOURS & COMPANY, OF WILMINGTON, DELAWARE, A CORPORATION OF DELAWARE

COATING

No Drawing. Application filed January 22, 1926. Serial No. 83,137.

This invention relates generally to the art of coating and has particular relation to promoting adhesion between a coating composition and the surface to which it is applied.

In the application of certain types of coating compositions, particularly those containing a large proportion of volatile solvent, it has been found that the coats often do not adhere to surfaces of certain types, such as plaster board, wall plaster, rubber, paper, paper board, asbestos board, plasticized paper compositions or fabrics, or surfaces which have been coated with an oil-type or varnish-type coating composition. The difficulty of non-adherence of oil- or varnish-type coats is not generally encountered due to the nature of the materials. These latter compositions generally do not shrink on drying and, on the contrary, often swell to a slight extent, probably due to oxidation. With the solvent-type coating compositions, such as pyroxylin or other cellulose ester lacquers, it has been found that non-adhesion of the coating material to the surface to which it is applied is a difficulty which often arises. This may be due to the shrinkage of the coat caused by the volatilization of the solvent material. While successive pyroxylin lacquer coats can be made to adhere to each other, since the solvent of an upper coat partially redissolves the pyroxylin of the lower coat, good adhesion is not obtained when the pyroxylin lacquer is applied to a surface of a different type.

I have devised a procedure for promoting adhesion between a coating composition of the solvent-type and the surface to which it is applied, the final coating being adherent in spite of the general nature of the under surface. This procedure is based upon the discovery that if the surface to which the solvent-type coating composition is to be applied contains a material insoluble in the surface composition, but which material is at least somewhat soluble in the vehicle of the coating composition, a satisfactory adherence of the coating composition to the surface is obtained. Among other advantages the invention provides for the application of a pyroxylin upper coat to an oil-type undercoat, obtaining satisfactory adherence between the successive coats, which procedure generally has been impossible to carry out. I shall describe my invention with particular reference to the application of a pyroxylin lacquer to an oil- or varnish-type undercoat, it being understood that the invention applies to the promotion of adhesion between a solvent-type coating composition and any surface to which it does not normally adhere.

In the application of the invention to an oil-type undercoat and an upper coat of pyroxylin lacquer, I use in the oil under-coat composition a small amount of ground nitro-cellulose, which, as above indicated, is insoluble in this oil but is at least somewhat soluble in the pyroxylin composition to be applied. Upon application of the pyroxylin coat a good adherence is obtained between the coats and, further, the coating is hard and tough. The coats are well adapted to be rubbed down and treated in the usual manner for obtaining a smooth finished surface.

A suitable varnish-type under-coat or base coat to which a pyroxylin coat may be applied with satisfactory adherence between the two films is as follows:

Base coat A

| | Parts |
|---|---|
| Lithopone | 50 |
| Pyroxylin | 5 |
| Varnish base | 12 |
| Turpentine | 33 |
| Total | 100 |

The above ingredients are mixed and ground in a burr mill to give a wood surfacer composition. The varnish base may consist of China wood oil resin varnish. The pyroxylin is preferably thoroughly dried before grinding. This surfacer material when sprayed upon a poplar panel and after being dried over night is readily sanded to a glass-like surface. Two coats of nitro-cellulose lacquer adhere well and give a tough, hard and smooth finish.

The invention is adaptable to other than varnish and oil-type under-coats to which the pyroxylin lacquer does not ordinarily adhere, such as, for instance, when the under-coat composition is of such material as shellac, rubber or gelatin, etc.

A suitable non-oil type under-coat or base coat may be made according to the following formula:

*Base coat B*

| | Parts |
|---|---|
| Gum arabic | 10 |
| Zinc oxide | 5 |
| Plaster of Paris | 20 |
| Pyroxylin | 5 |
| Water | 60 |
| Total | 100 |

The above composition is mixed and ground in a ball mill and may be used as a surfacer. By grinding the same composition to paste form in a burr stone mill, it is suitable for use as a crack filler. Nitrocellulose lacquers adhere well to this surfacer and give a tough, hard and smooth finish.

Any suitable apparatus may be used in preparing the coating composition. Any mill used for grinding pigment into a vehicle may be employed, using such apparatus as may be found desirable.

Any suitable method of grinding may be used. The finely divided but undissolved nitrocellulose may be ground into the base-coating material itself, or it may be ground into a vehicle or fluid, miscible with the coating composition, and this fluid with its contained nitrocellulose added subsequently to the under-coat composition. Nitrocellulose may also be ground in water until it is finely divided, forming a thick paste. The water-nitrocellulose paste is then mixed with an oil, linseed oil, for example, whereupon the finely divided nitrocellulose goes into the oil phase, leaving the water in such form that it may be poured off. The resulting oil-nitrocellulose mixture may then be used in the production of the desired base coat composition. The method of grinding the nitrocellulose in water or other liquid is usually preferable in that the fire hazard and danger of grinding are greatly reduced.

Any suitable proportion of the desired insoluble binding material, such as nitrocellulose, may be introduced into the base coat composition. The amount used is dependent, almost entirely, upon the results desired, economy, etc. It has been found that the usual range of insoluble material introduced may vary conveniently between 0.1% and 20% by weight of the under-coat composition.

It is sometimes feasible and desirable to mix with the nitrocellulose suitable softening agents, such as camphor, ethyl alcohol, etc. By softening agents are meant those materials which alone or in combination with a non-solvent for pyroxylin, exert a swelling or colloiding action upon the pyroxylin. The softening agents for the pyroxylin greatly increase the amount of vehicle which may be used with the pyroxylin or nitrocellulose, thereby permitting the cheapening of a surfacer composition by allowing the use of a greater proportion of thinner than is possible with the unsoftened pyroxylin. It also has been found that under-coat compositions containing nitrocellulose softened with alcohol, for instance, give a coating which, when dried, can be dusted off the wood surface to which it has been applied. This dusting effect is often a highly desirable quality in the under-coat.

Any suitable form of nitrocellulose or other cellulose ester may be used in the under-coat. The nitrocellulose itself may be of various types, such as nitrocellulose reduced in viscosity, etc. By nitrocellulose reduced in viscosity is meant that form of nitrocellulose which has been treated in any one of a number of well-known ways to change the viscosity-characteristic of the cellulose esters in such a way that the viscosity of a solution of the treated ester will be substantially less than the viscosity of the solution (in the same solvent and with the same ester content) of the untreated ester. Nitrocellulose reduced in viscosity, say according to the method described in United States Letters Patent 1,535,438, April 28, 1925, is well adapted for use in the coating compositions described. In general the suitable nitrocelluloses reduced in viscosity have a nitrogen content of from about 10.5% to about 12.6%. The nitrocelluloses reduced in viscosity are particularly valuable for use in making up the desired undercoat compositions, in view of the fact that they are more easily ground than the nitrocelluloses which have not been reduced in viscosity.

The invention has been described particularly with reference to cellulose ester coatings, but is not limited thereto. Instead of applying the invention to the process of coating an oil-type under-coat with cellulose-ester type over-coats such as those containing pyroxylin, or cellulose acetate, etc., this method of obtaining adhesion between dissimilar coats may be used with any coating in which a top coat is applied to a dissimilar under-coat, the two coats ordinarily being substantially non-adherent, by incorporating into the under-coat a substance insoluble in said under-coat composition, but at least somewhat soluble in the subsequently applied over-coat composition.

Any suitable variations in proportions, methods of mixing, and methods of applying the coatings may be made without departing from the spirit of the invention.

The invention has been described in some detail with reference to the application of solvent-type over-coats to an under-coat composition to which the top coating does not normally adhere. As described, this is accomplished by incorporating into the under-coat a material substantially insoluble in said under-coat composition, but at least somewhat soluble in the top-coat composition. By this means satisfactory adherence between the respective layers or coats is obtained. Likewise, the same method of promoting adhesion may be applied in the coating of certain types of surfaces to which the coating composition is normally substantially non-adherent. Pyroxylin lacquers do not adhere to any great degree to such surfaces as rubber, paper, paper board, plasticized paper compositions or fabrics, wall plaster, plaster board, absestos board, etc. However, by incorporating into these surfaces a modicum of nitrocellulose or other substance which is insoluble in the surface composition, but which is at least partially dissolved by the coating composition, the coating composition will be made to adhere satisfactorily to the surfaces described. This nitrocellulose or other binding material may be incorporated into a surface in any suitable manner, and its proportions may vary within any suitable range such as, for instance, that described above with reference to the application of a pyroxylin lacquer to an oil-type under-coat.

I claim:

1. In a process of applying a pyroxylin lacquer to a surface to which the lacquer is normally substantially non-adherent, the step which comprises incorporating into said surface, prior to the application of the lacquer, undissolved nitrocellulose in finely divided form.

2. In a process of applying a cellulose ester lacquer to a surface to which the lacquer is normally substantially non-adherent, the step which comprises incorporating into said surface, prior to the application of the lacquer, undissolved cellulose ester in finely divided form.

3. The process of claim 2 in which the cellulose ester forms from 0.1%–20% by weight of the under-coat composition.

4. In the process of applying a cellulose ester-type coating composition to an oil-type under-coat, the step which comprises incorporating into the under-coat, prior to the application of the succeeding coat, a cellulose ester material insoluble in the under-coat but being at least somewhat soluble in said succeeding coat.

5. The process of claim 4 in which the cellulose ester introduced forms from 0.1%–20% by weight of the under-coat composition.

6. In the application of a pyroxylin coat to a varnish-type under-coat to which the pyroxylin coat is normally substantially non-adherent, the step which comprises mixing with the under-coat, prior to the application of the pyroxylin coat, a modicum of nitrocellulose which is insoluble in the under-coat.

In testimony whereof I affix my signature.

EDWARD C. HAINES.